Patented Aug. 14, 1934

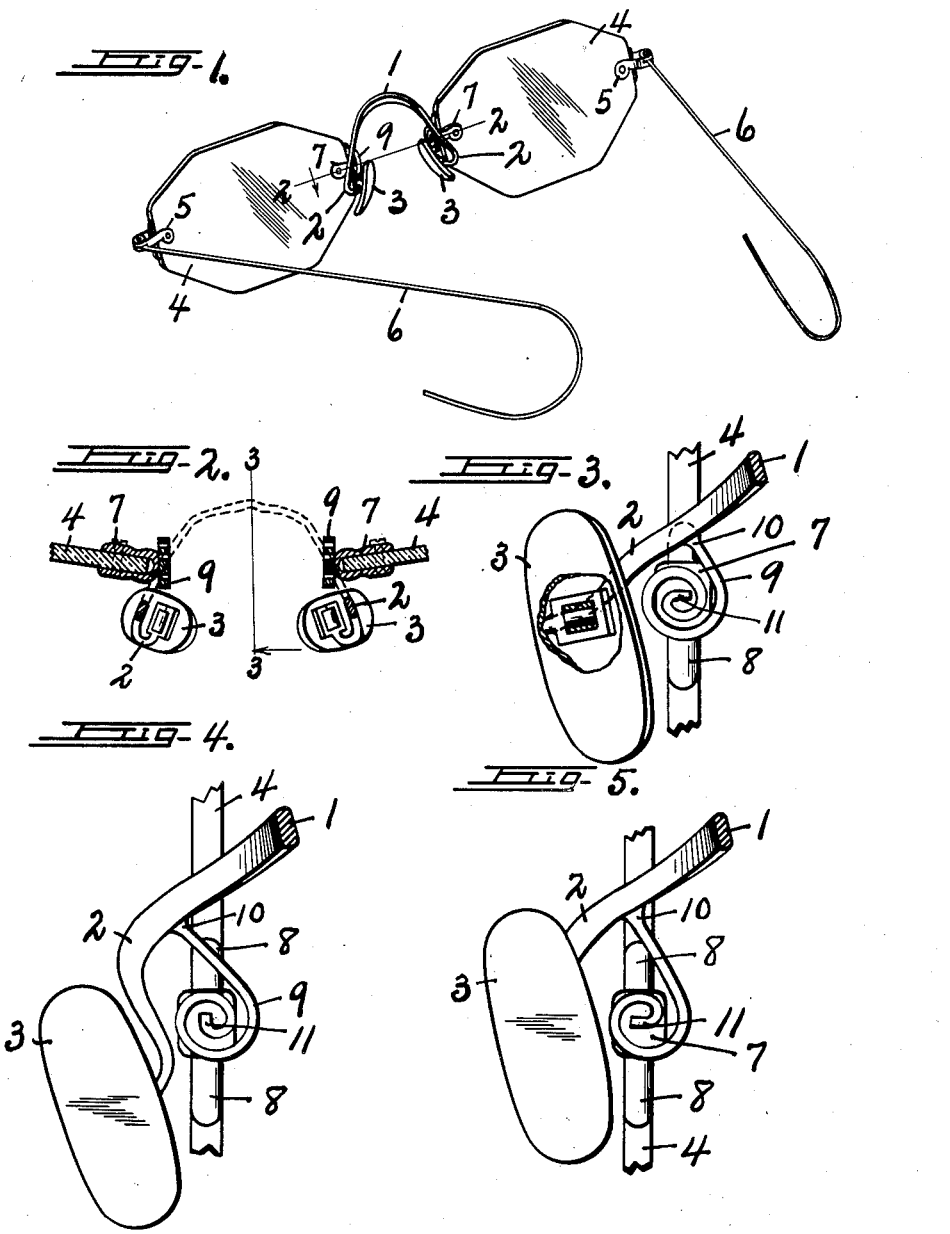

1,970,504

UNITED STATES PATENT OFFICE 1,970,504

SPECTACLES

William E. McDonnell, Rochester, N. Y., assignor to Shuron Optical Company, Inc., Geneva, N. Y., a corporation of New York Application December 26, 1931, Serial No. 583,337

5 Claims. (Cl. 88—42)

This invention relates to certain new and useful improvements in spectacles.

The main object of the present invention is the production of a more compact, efficient and permanent spectacle in which a rigid bridge is utilized in connection with nose pad supports rigidly secured thereto and adapted for permanent adjustment with respect to the bridge so that these portions of the spectacle will remain at all times in permanent adjustment to fit the nose of the wearer regardless of movement or deflection of other parts combined with resilient members in the form of a coil or coils connecting the rigid bridge and the lens supports or clamps so as to permit relative movement of the lens supports and lenses carried thereby, on and with respect to the bridge, but without in any way disturbing or affecting the permanent adjustment of the bridge and the nose pad supports.

These resilient connecting members, due to their elasticity, act to normally maintain the lenses in predetermined alignment with the bridge, eliminating the necessity of frequent readjustment, but permitting, under actuation by the temples or otherwise, of temporary displacement from true alignment and in general permitting universal movement of the lenses with respect to the bridge and nose pad supporting members thereon.

Another advantage incident to the construction above generally outlined in connection with the main object set forth, resides in the fact that the resilient connecting coil between the lens support and the rigid bridge with its permanently adjusted pad supports, constitutes a shock absorber and eliminates to a great extent, breaking of the lens at the point or points of its connection to the lens clamp or clamps.

Furthermore, the elastic connection described, prevents the temples, which are the means for securing the spectacles to the wearer, from exerting any appreciable force upon the bridge and permanently adjusted nose pad supports which would tend to bend the bridge or pad supports in a manner to effect their permanent adjustment.

The specific features of improvement involved in the present construction may be said to reside in a spectacle having the operating characteristics above described and which is neater in appearance, easier to manufacture, provides a maximum of room laterally for the nose, permits the use of a comparatively long resilient connecting member without requiring additional space, thereby producing a more effectively operating resilient member and reducing, to a minimum, the liability of said member to crystallization and reducing the possibility of permanent distortion of said member.

Further, with the present construction, the coils of the spring lie substantially parallel with the adjacent side surfaces of the wearer's nose effecting a substantial economy in space. Further, the center of the spring coil and therefore the axis of swing of the lenses lies substantially in the plane of the lenses whereby the inner edges of the two lenses will remain at a constant distance apart when swung horizontally so that space between the bridge and lenses is not required to permit relative movement.

Further, with this construction, it is possible to produce nose pad carrying arms constituting integral continuations of the bridge legs, eliminating the necessity of soldering these parts together in the usual manner and reducing the number of joints required to produce the mounting.

Other objects and advantages relate to the details of construction, form and arrangement of the spectacle and the parts thereof, all as will more fully appear from the following description taken in connection with the accompanying drawing, in which:—

Figure 1 is a perspective view of a spectacle of this invention.

Figure 2 is a section on line 2—2, Figure 1.

Figure 3 is a section on line 3—3, Figure 2.

Figure 4 is an elevation of a slightly modified form which the invention may take.

Figure 5 is a view similar to Figure 4, illustrating a further modified form.

In general, the spectacle illustrated, comprises a substantially rigid bridge 1 carrying nose pad supporting arms 2 which are formed as integral extensions of the legs of the bridge. These nose pad carrying arms are return bent inwardly to form loops or U-shaped sections upon the inner free ends of which the nose pads 3 are mounted in any suitable and well-known manner.

These nose pad carrying arms, as well as the bridge, are formed of a material that in use is substantially rigid and has little, if any resiliency but is, on the other hand, sufficiently ductile to permit its adjustment or de-formation as may be required by a particular user, the adjustment being of a permanent nature to fit the nose of the wearer and to position the parts in desired relation in accordance with the facial contour of the wearer.

The lenses 4 are disposed upon opposite sides of the bridge and have in a rimless construction, lens clamps 5 secured to the lenses at their outer edges and including ears to which the temples are pivotally connected in any usual manner.

The lenses in a rimless construction are also provided at their inner edges, with lens clamps 7 secured to the lenses in any usual manner as by small screws, and the lens clamps, as shown, may include oppositely extending flanges 8 extending upwardly and downwardly along the inner edge of respective lenses to prevent the movement of the lens with respect to its clamp.

Although the invention has been shown as applied to a rimless construction, it will be apparent that its application is the same when the lenses are mounted in rims.

The clamps 7 and the lenses 4 secured thereto, are connected to the rigid bridge by readily resilient or elastic connecting members 9, and the particular feature of this invention resides in the form and positioning of these resilient connecting members in association with the rigid bridge and the lens clamps with the additional combination of such form and positioning of the resilient connecting members in association with nose pad carrying arms or members which constitute integral continuations of the opposite legs of the bridge.

The resilient connecting members 9 may perhaps preferably consist of strips of resilient or elastic metal such as gold, although the comparatively great length of resilient members possible by reason of the compact construction and form here illustrated, may permit the use of other and less expensive metals such as gold alloys or gold filled.

With the understanding that it is highly important in spectacles to provide the required nose space without separating the lenses to such an extent that they must be made smaller than desired in order that their optical centers may be properly positioned, a substantial feature of improvement in the spectacle herein illustrated, resides in the form and arrangement of the resilient connecting elements which constitute the sole supports for the lenses from the rigid bridge whereby substantially universal movement is permitted between the lenses and the rigid bridge without in any way affecting the form or shape of the bridge or in any way affecting the permanent adjustment of the nose pad supporting members secured to and carried by the bridge. In this instance, the form and arrangement of the parts permit this securement of the nose pad carrying members to the bridge to be of an integral character thereby eliminating the necessity of soldering the parts, together with the resulting undesirable joints.

It will be seen from an examination of the drawing, that the nose pad carrying members not only incline downwardly at the rear of the lenses, but also incline outwardly and have their ends return bent inwardly for attachment to the nose pads. This permits the securement of one end 10 of the resilient connecting member 9 to the lower edge of the bridge forwardly of the pads and in this construction, the resilient member 9 is formed in a coil, the axis of which is substantially parallel with the normal plane of the lenses, and this coil is disposed closely adjacent to and preferably against the inner surface of the lens clamp 7 so as to lie substantially directly underneath that portion of the bridge which extends from front to rear across it.

With this arrangement, where the width of the resilient member 9 is substantially the same as the thickness of the bridge where the latter overlies the former, the resilient connecting member 9 does not require any additional spacing of the lens from the bridge in order to permit its use, and when viewed from the front, it appears to be a mere vertical downward continuation of the bridge itself. The opposite end 11 of the spring may be connected in any suitable manner to the lens clamp as, for instance, by soldering.

As shown in Figures 1, 2 and 3, the resilient member 9 is of sufficient length to constitute two complete coils, preferably concentrically arranged one within the other, so as to provide a substantial degree of resiliency between the lens and the bridge, and without the necessity of bending any particular part of the resilient member 9 beyond its elastic limit or sufficiently to cause or tend to cause the crystallization of the material.

It will be apparent that the longer the resilient member 9, the less relative movement is required at any point therealong to effect any pre-determined relative movement between the lens and the rigid bridge. Therefore, it is desirable to utilize as long a spring as possible and with the arrangement here shown in which the coils are arranged vertically about a substantially horizontal axis against the inner side of the lens clamps and underneath the legs of the bridge, it is possible to lengthen the resilient member 9 to any desired extent within reasonable limits without necessitating any increased spacing of the lenses and the bridge. This close spacing of the bridge and lenses permits the use of comparatively large lenses which are desirable, with the centers of such lenses in desired position before the eyes of the wearer.

In Figure 4, an arrangement of resilient members 9 is illustrated substantially the same as that shown in the previous figures, except a lesser length of coil is made in the resilient member, although the upwardly extending arm of the coil which is connected to the bridge, may be somewhat longer so as not to decrease the length of the resilient member any more than the proper relative positioning of the elements requires.

Figure 5 illustrates a further modification in which the resilient member 9 has practically a single coil. Although this may not be as efficient in operation as the structure of Figure 1, still it has been found in practice, effective in accomplishing the objects of this invention, and satisfactory and practical in use.

In all of the embodiments of the invention illustrated herein, the coil of the resilient member 9 is disposed adjacent and preferably in substantial contact with the inner edge of the lens clamp so as to practically underlie the portion of the bridge extending above it and, therefore, its use requires no additional spacing of the lens and the bridge.

Further, resilient member 9 is so compactly arranged, that it is not objectionable from the standpoint of appearance, but rather constitutes a neat and ornamental structure in which the member seems to constitute a depending portion of the bridge.

It will be understood that the expression "lens clamp" as used in the claims hereof, includes not only the clamps, as illustrated in connection with a rimless construction, but also the rims which surround, clamp and support the lenses in the usual rim spectacle construction, as the operation and positioning of the resilient connecting element is the same in both cases.

Although, for the purpose of illustration, I have shown and described specific embodiments and forms that the invention may take, I do not desire to restrict myself to the exact construction, form or arrangement as disclosed, for the reason that various modifications and changes may be made without departing from the spirit of the invention, as set forth in the appended claims.

I claim:

1. A spectacle comprising a pair of lenses, lens clamps secured to the lenses, a substantially rigid bridge having legs extending rearwardly and downwardly with respect to the plane of the lenses, nose pads carried by said and adapted for permanent adjustment with respect to each other, resilient elements having one end permanently and rigidly connected to the respective legs of the bridge and having their intermediate portions formed in coils with substantially horizontal axes and arranged close to the lens-clamping members and underlying the rearwardly extending portions of said bridge legs and the other ends of said resilient elements being connected to respective lens-clamping elements, said resilient elements constituting the sole supports for the lens clamps and lenses from the bridge and permitting swinging movement of the lenses with respect to the bridge and nose pads.

2. A spectacle comprising a pair of lenses, lens clamps secured to the lenses, a substantially rigid bridge having legs extending rearwardly and downwardly with respect to the plane of the lenses, nose pad carrying arms constituting integral continuations of the legs of said bridge, nose pads carried thereby and adapted for permanent adjustment with respect to each other, resilient elements having one end permanently and rigidly connected to the respective legs of the bridge and having their intermediate portions formed in spiral coils with axes substantially horizontal and parallel to the plane of the lenses and arranged close to the lens-clamping members and underlying the rearwardly extending portions of said bridge legs and the other ends of said resilient elements being connected to respective lens-clamping elements, said resilient elements constituting the sole supports for the lens clamps and lenses from the bridge.

3. A spectacle comprising a pair of lenses, lens clamps secured to the lenses, a substantially rigid bridge inclined rearwardly and downwardly with respect to the plane of the lenses, nose pads carried thereby and adapted for permanent adjustment with respect to each other, resilient elements having one end permanently and rigidly connected to the respective sides of the bridge and having their intermediate portions formed in coils with substanially horizontal axes and arranged close to the lens-clamping members and underlying the portion of the inclined bridge to which the resilient elements are rigidly connected and the other ends of said resilient elements being connected to respective lens-clamping elements.

4. A spectacle comprising a pair of lenses, lens clamps secured to the lenses, a substantially rigid inclined bridge, nose pads carried by the bridge, resilient elements having one of their ends extending upwardly, and permanently and rigidly connected to the bridge and having their intermediate portions formed in coils with substantially horizontal axes, and arranged close to the lens-clamping members and underlying the portion of the inclined bridge to which the resilient elements are rigidly connected, and the other ends of said resilient elements being connected to respective lens-clamping elements.

5. A spectacle comprising a pair of lenses, lens clamps secured to the lenses, a substantially rigid inclined bridge, nose pads carried by the bridge, resilient elements having one of their ends extending upwardly, and permanently and rigidly connected to the bridge and having their intermediate portions formed in coils with substantially horizontal axes, and arranged close to the lens-clamping members and underlying the portion of the inclined bridge to which the resilient elements are rigidly connected, and the other ends of said resilient elements being connected to respective lens-clamping elements, said resilient elements constituting the sole supports for the lens clamps and lenses from the bridge and permitting swinging movement of the lenses independently of the bridge and nose pads.

WILLIAM E. McDONNELL.